United States Patent [19]

Eller

[11] 4,194,810
[45] Mar. 25, 1980

[54] TRUCK TIRE SAFETY REFLECTOR

[75] Inventor: Dennis E. Eller, Algona, Iowa

[73] Assignee: Donald J. Hess, Clear Lake, Iowa; a part interest

[21] Appl. No.: 954,569

[22] Filed: Oct. 23, 1978

[51] Int. Cl.² ............................................. G02B 17/02
[52] U.S. Cl. ...................................... 350/99; 188/49; 301/37 CD
[58] Field of Search ............... 350/99, 97; 301/37 SA, 301/37 TC, 37 A, 74, 105 P, 126, 126 TC, 126 T, 126 P, 126 N; 152/153 A, 396; 188/264, 491 A, 18 R, 71.5, 76, 79.5 SS, 82.8, 82.3, 140 R, 346, 211, 265, 1 A, 173.3; 40/129; 13/11; 280/400

[56] References Cited
U.S. PATENT DOCUMENTS

| | | | |
|---|---|---|---|
| 1,703,489 | 2/1929 | Kahlert et al. | 350/99 |
| 3,007,743 | 11/1961 | Lange | 350/99 |

Primary Examiner—John K. Corbin
Assistant Examiner—B. W. de los Reyes
Attorney, Agent, or Firm—Clarence A. O'Brien; Harvey B. Jacobson

[57] ABSTRACT

The reflector attaches to the rim of a wheeled vehicle and revolves about the center of the wheel, thus following an eccentric path when the vehicle travels in a straight path. The reflector has one surface which is substantially parallel to the plane of the wheel and another surface which extends transversely of that plane. In this manner, the driver of the vehicle may easily see the reflections and a stationary observer may also be aware of the reflector. While the wheel is rotating, the path of the reflector becomes obvious and in cases of wheels which have become locked due to defective brakes, or the like, the reflector will remain stationary and follow a linear path along the highway, thus giving an indication that the brake is defective.

7 Claims, 5 Drawing Figures

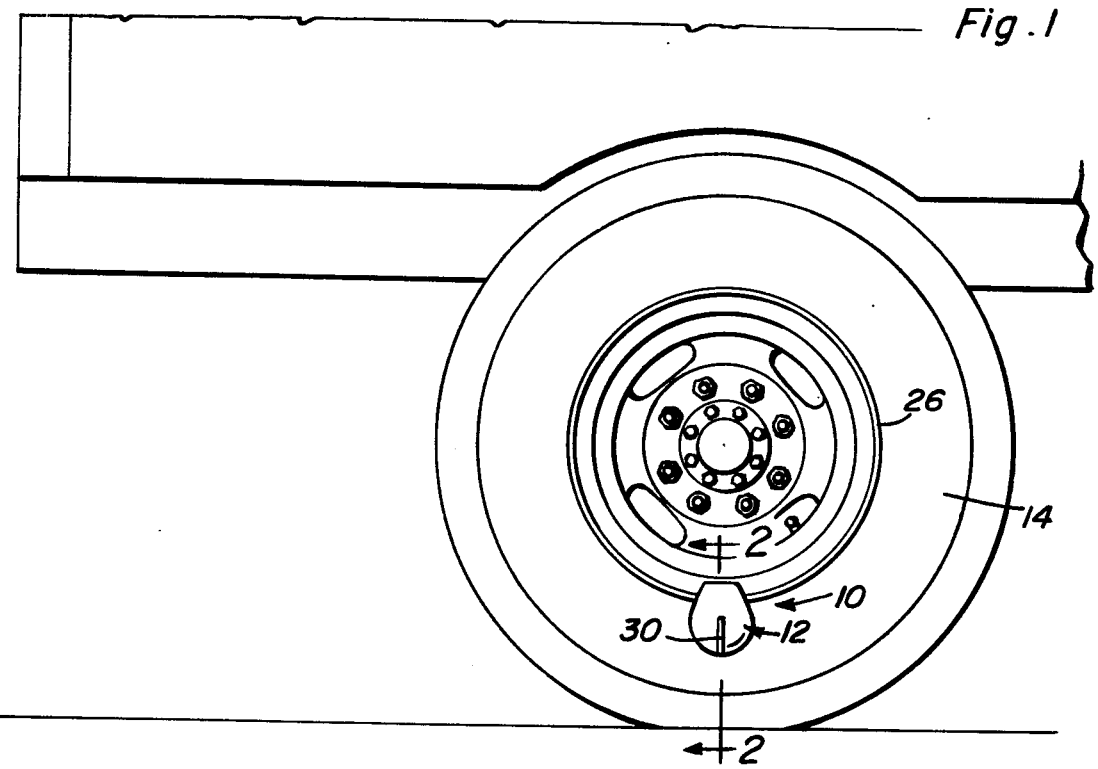
Fig. 1
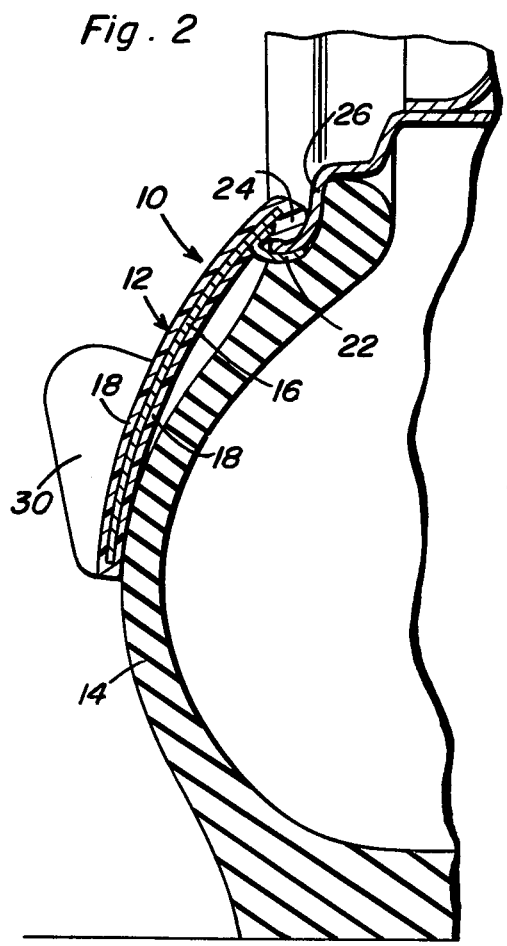
Fig. 2
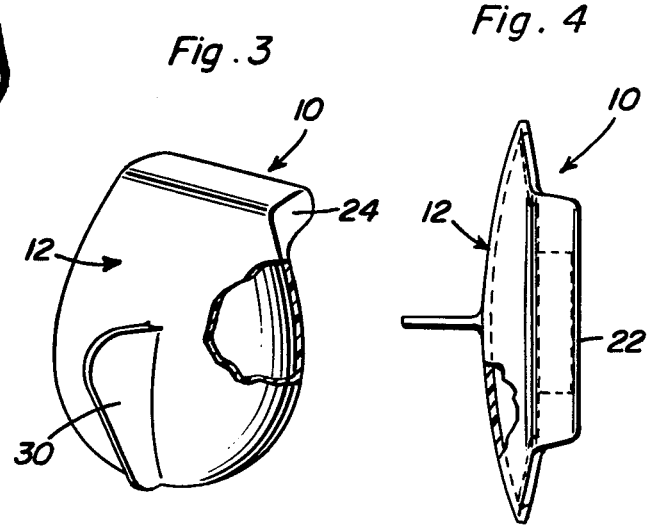
Fig. 3
Fig. 4
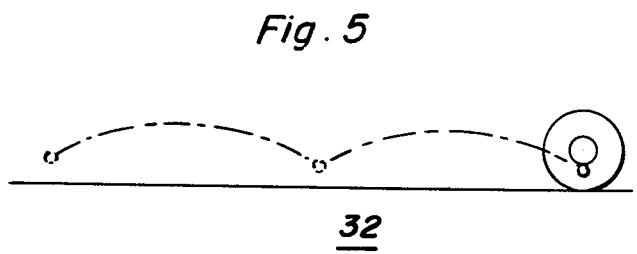
Fig. 5

TRUCK TIRE SAFETY REFLECTOR

BACKGROUND OF THE INVENTION

1. Field of the Invention

This invention relates to safety reflectors and especially to reflectors which are adapted to be attached to the rim of a wheel.

2. Description of the Prior Art

It is common knowledge that at times the brakes of large trucks and tractor trailers fail to release properly thus causing a wheel or wheels to be dragged along the roadway. This condition causes premature wear to the tire and forms flat spots on the tire often destroying the useful life of the tire completely. There is need in the industry for a simple, inexpensive and effective device for signalling the existence of this condition.

It is presently known to attach ornamental objects to the wheels of vehicles. For instance, U.S. Pat. No. 2,621,081, issued Dec. 9, 1952, to Mann, shows an ornamental attachment for wire wheels, such as those used on a bicycle. The Mann device comprises a spirally shaped wheel ornament for positioning between and upon the interior of the wire spokes. U.S. Pat. No. 3,918,763, issued Nov. 11, 1975, to Harris, shows wheel trim for the axially outer face of a vehicle wheel. The Harris discloses improvements in the annular retention band member used to secure the wheel trim in place.

SUMMARY OF THE INVENTION

The present invention provides a simple, inexpensive, yet effective means for informing a vehicle operator or stationary observer of the improper functioning of the brakes of a vehicle by showing an altered pattern of movement of the device.

A further object of the present invention is to provide an indication to the operators of vehicles approaching laterally of the vehicle equipped with the device of the presence of the so equipped vehicle by providing a reflection toward the oncoming vehicle.

A still further object of the present invention is to provide a reflective device which may easily be attached to the rim of a wheeled vehicle and will remain stationary on the rim.

Yet another still further object of the present invention is to provide a reflector which has an element which projects laterally of the wheel for producing a reflection toward the front and rear of the vehicle in order that the operator of the vehicle will be easily able to determine the existence of a brake malfunction.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of the reflector attached to the wheel of a truck.

FIG. 2 is a front elevational sectional view taken substantially along a plane passing through section line 2—2 of FIG. 1.

FIG. 3 is a perspective part sectional view showing the construction of the reflector.

FIG. 4 is a plan part sectional view of the reflector.

FIG. 5 is a schematic illustration demonstrating the path taken by the reflector as view by a stationary observer.

DESCRIPTION OF THE PREFERRED EMBODIMENT

The truck tire safety reflector of the present invention will now be explained in detail with reference to the accompanying figures wherein the reflector is generally referred to by the numeral 10. With specific reference to FIGS. 1 through 4, it will be seen that the reflector 10 is composed of a main convex body portion 12 which rests against tire 14, which may be a tire of a truck, semi-tractor, trailer, or any other appropriate wheeled vehicle. The main body 12 comprises a convex structural member 16 which may be thin plate steel or any other sturdy member bent into the proper configuration. A reflective or luminescent coating 18 may be placed on the body 16 in any known manner. For instance, the body may be dipped in such material thus providing coating on both sides thereof.

Clip member 22 is attached to body member 16 in any known suitable fashion and is shaped coaxially with bulge 24 such that wheel rim 26 may be held therebetween and form a firm engagement therewith. Clip 22 may be of any suitable resilient material, such as spring steel, or the like. Bulge 24 may be made of any suitable material also, such as plastic, metal or it may merely be an extension of the reflective material 12.

Disposed in a plane normal to that of the main body 12 is a reflective lateral member 30. Member 30 extends from the bottom of body 12 to a position medial of the body. Member 30 may be metal or any other suitably hard material and is also covered with reflective material identical to that shown at 18. The member may be connected to element 16 by any suitable means or the entire metallic body may be molded in a unitary manner prior to being covered by reflective material 18. Member 30 provides reflection in a direction parallel to the wheel 14 for observation by the vehicle operator.

It will be noted that body 12 as well as being convex has a substantially circular shape. A radius of 1.75 inches for this body has proven to provide substantial surface area for the reflector to be effective. Of course, it will be understood that body 12 may be of any desired shape with the circular configuration shown being for illustrative purposes only. Lateral member 30 has a maximum lateral extension of approximately 0.75 inches and a length along body 12 of approximately 1.75 inches. These dimensions have been found to be suitable for providing sufficient reflective properties to insure that the operator of the vehicle will be able to visually observe the reflector without having to lessen the concentration needed to operate the vehicle.

FIG. 5 demonstrates the path taken by reflector 10 when the vehicle is travelling along a flat road surface shown at 32. It will be seen, therefore, that any sticking of the brake sufficient to produce skidding of the wheel will significantly alter the reflector path thereby providing a clear indication of the brake failure. Of course, as observed from the cab of a truck, the reflector will be seen travelling in an up and down motion. With the sticking of the vehicle brake, the reflector will appear to remain stationary to the vehicle driver, thus indicating the brake failure.

To enhance the observability of the reflector, designs may be incorporated in the reflective material. For instant, if reflective paint is used to cover the device, lines, stripes, swirls, or other distinctive markings may be painted on the reflector in order to make the device more visible.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A safety reflector device for attachment to the rim of a wheeled vehicle comprising: a main body portion having a reflective coating connected thereto; a clip means attached to the body portion for connection to the rim of a wheeled vehicle to hold the body portion against the tire of the wheeled vehicle, said clip means comprising a bulge connected to said body portion and a resilient curved member coaxial with said bulge for insertion behind said rim to hold said rim betweeen said resilient member and said bulge; and a substantially flat reflective member connected to the body portion and extending laterally from the body portion for providing reflections in a plane parallel with the longitudinal dimension of the wheeled vehicle.

2. The reflector of claim 1 wherein the body portion has an outward facing convex shape.

3. The reflector of claim 1 wherein distinctive markings in the form of a design are incorporated in the reflective surface of the reflector.

4. The reflector of claim 1 wherein the circumference of the reflector is much less than the circumference of the wheel to which it is attached.

5. In combination, a vehicle having at least one wheel comprising a rim with a tire attached to the rim, and a reflector attached to the rim for rotation with the tire about the tire axis, the reflector being attached to the wheel at a position radially spaced from the wheel center thereby causing the reflector to follow an eccentric path upon the rolling of the wheel along a surface, said reflector having a substantially convex body positioned against the axially outwardly facing surface of the wheel for providing an indication of the active rotation of the wheel, said reflector including a lateral reflective extension connected to said body and lying in a plane normal to the wheel for providing an indication of wheel rotation through reflection in a direction parallel to the vehicle.

6. The combination of claim 5 wherein the lateral refective extension has a surface area which is substantially less than the surface area of the reflective body.

7. The combination of claim 5 wherein the circumference of the reflector is much less than the circumference of the wheel.

* * * * *